United States Patent [19]
Pegels et al.

[11] 3,966,420
[45] June 29, 1976

[54] APPARATUS AND PROCESS FOR THE CATALYTIC TREATMENT OF HYDROCARBONS

[75] Inventors: Abraham A. Pegels; Joannes B. Wijffels, both of The Hague, Netherlands

[73] Assignee: Shell Oil Company, Houston, Tex.

[22] Filed: Jan. 10, 1975

[21] Appl. No.: 540,307

[30] Foreign Application Priority Data
Feb. 8, 1974 Netherlands.................. 7401733

[52] U.S. Cl. ........................ 23/288 R; 23/288 E; 23/288 G; 23/288 S; 141/1 R; 423/230
[51] Int. Cl.² .................... B01J 8/04; B01J 8/12; B01J 8/20; B01J 8/44
[58] Field of Search .......... 23/288 R, 288 G, 288 E, 23/288 S; 423/230; 141/1, 113

[56] References Cited
UNITED STATES PATENTS

| | | | |
|---|---|---|---|
| 2,320,318 | 5/1943 | Simpson et al. ................ | 23/288 G |
| 2,672,407 | 3/1954 | Leffer .............................. | 23/288 S |
| 2,700,595 | 1/1955 | Probst .............................. | 23/288 S |
| 3,002,805 | 10/1961 | Browning, Jr. et al. ........ | 23/288 G |
| 3,715,193 | 2/1973 | Strelzoff ........................... | 23/288 R |

*Primary Examiner*—Morris O. Wolk
*Assistant Examiner*—Barry I. Hollander

[57] ABSTRACT

Apparatus for catalytic processes such as desulfurization of hydrocarbons comprises an upright reactor vessel containing at least one tray and catalytic support means for one or more catalyst beds; said support means, being permeable to fluids and impermeable to catalyst particles, are attached to the inner wall of the reactor vessel and are at least partly in the shape of a conical surface of a truncated cone converging downwardly to an aperture permeable to catalyst particles; located beneath each supporting means is a fluid permeable tray which is impermeable to catalyst particles and having an aperture permeable to catalyst particles. A method for loading said apparatus with catalyst by means of a carrier oil is also disclosed.

12 Claims, 3 Drawing Figures

APPARATUS AND PROCESS FOR THE CATALYTIC TREATMENT OF HYDROCARBONS

BACKGROUND OF THE INVENTION

This invention relates to a novel catalytic reactor and method for loading thereof. Apparatuses for catalytic treatment, for example, desulfurization, of distillate fractions are known. In operation, such an apparatus generally contains 10–100 m³ of catalyst distributed over one or more beds which have to be purified after a period of time, not so much on account of a decline in catalyst activity, but rather as a consequence of contamination ultimately resulting in an excessive pressure drop across the catalyst bed. For the purpose of this purification, it is frequently necessary for the contaminated catalyst to be removed from the apparatus, requiring entry by personnel into the opened reactor in order to remove consecutively the supporting means of the beds situated one above the other. Since any iron sulphide formed during desulphurization is often pyrophoric, it is desirable that the catalyst should first be deactivated in this respect. After dismantling, the reactor beds have to be built up again by reassembling the supporting means and loading with fresh or purified catalyst. The rate at which catalyst can be unloaded from such a reactor is approximately 4 m³/hr, and the loading rate is approx. 6 m³/hr. Since this unloading of the catalyst is necessary at most once a year, the loss of time involved in the shut-down and renewal of the bed does not form an insuperable drawback in the case of this size of apparatus. It is a more serious matter, however, in the case of larger apparatuses designed for the desulphurization of petroleum residues. To operate efficiently and economically, such an apparatus often has a much larger catalyst charge of the order of 500–1000 m³. In residue desulphurization, the bed not only becomes contaminated but moreover the catalyst activity declines relatively rapidly not so much because of coke formation as a result of the presence of asphaltenes, but rather by deposition, in the pores of the catalyst, of metals present in the petroleum residue. This may contribute towards necessitating much more frequent loading with fresh catalyst, for example once every six months. At the above-mentioned average catalyst handling rate of 5 m³/hr., 10 to 20 days are required for the unloading of the catalyst and the loading of the fresh catalyst. This means an annual loss of 10% or more of the operating time on account of this catalyst replacement. If an effort is made to compensate for this loss of time by increasing the capacity of the reactor, considerable additional capital expenditure is required.

SUMMARY OF THE INVENTION

The invention provides an apparatus suitable for the catalytic treatment of hydrocarbons, particularly, for the catalytic desulphurization of petroleum residues, comprising a reactor vessel containing at least one tray and catalyst support means for one or more catalyst beds, said support means being permeable to fluids and impermeable to catalyst particles, the supporting means are attached to the inner wall of the reactor and are at least partly in the shape of a conical surface of a truncated cone converging downwardly to an aperture permeable to catalyst particles; and located beneath each supporting means is a fluid permeable tray which is impermeable to catalyst particles, and having an aperture which is permeable to catalyst particles.

The invention also relates to a method for unloading and loading the catalyst beds.

The invention therefore provides an apparatus for the catalytic treatment of hydrocarbons, which apparatus is constructed in such a manner that the catalyst can be replaced without dismantling and reassembling the bed-suporting means, as a result of which it is now unnecessary for personnel to work in the reactor to replace the catalyst. Consequently, it is now also possible for the step of deactivation of the reactor contents to be omitted, provided that the catalyst is unloaded without coming into contact with air. The apparatus permits a significantly higher average catalyst handling rate on the order of 50–60 m³ of catalyst per hour.

DESCRIPTION OF PREFERRED EMBODIMENTS

Figure 1:
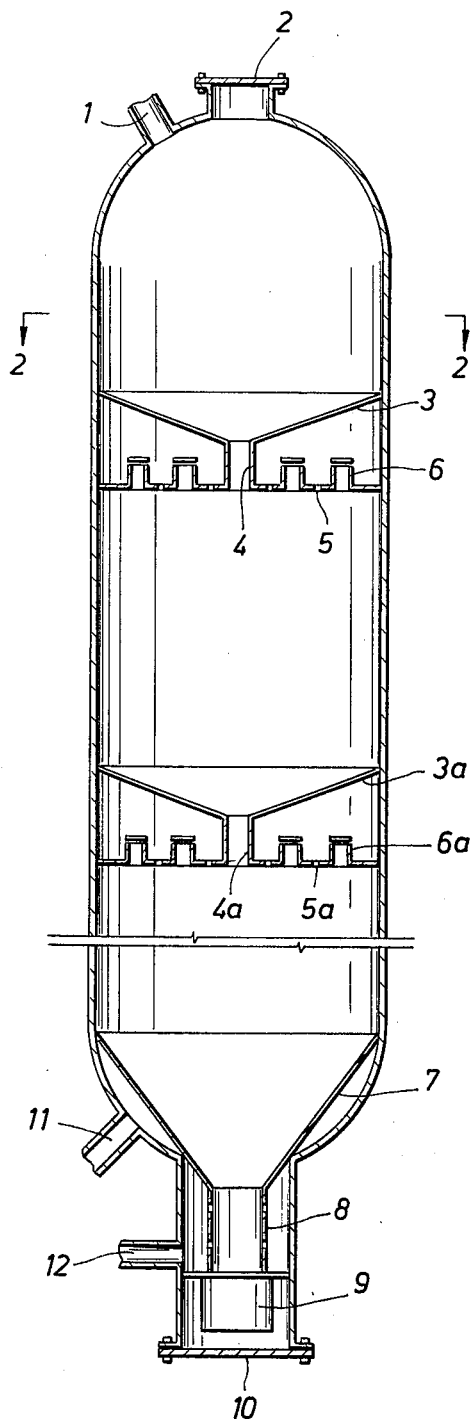
FIG. 1 is a longitudenal cross-section of a preferred embodiment of an apparatus according to the invention.

The supporting means may be in the shape of interconnected cylinders and/or surfaces of truncated cones of which the descriptive lines are at different angles to the axis of the reactor. It is advantageous for the supporting means of each catalyst bed to comprise a conical surface of one truncated cone, converging downwardly to an aperture permeable to catalyst particles, which aperture is situated centrally in the reactor.

The acute angle formed by a (the) descriptive line(s) of the conical surface(s) and the axis of the reactor is preferably between 35° and 45°. If this angle is larger, the catalyst particles will not slide downwards, or only do so with difficulty, while if considerably smaller angles are used, the empty space between the conical surface and the underlying tray is larger than necessary, and consequently the reactor can contain less catalyst at a given reactor volume.

The conical surface(s) may be, for example, manufactured of perforated plate with round or oblong openings. Preferably, however, the conical surface is a grid built up of groups of rods, wherein all the rods in each group run parallel to one another. More preferably the rods in each group run parallel to a descriptive line of the conical surface. The rods of the grid preferably have smooth lateral faces and are preferably so positioned that lateral faces of the rods form the bearing surface for the catalyst. This provides a smoother bearing surface than if rods of circular section are used. Rods having a triangular, trapezoid or rectangular section are very suitable.

It is preferred for the aperture of the supporting means which is permeable to catalyst particles, and the similarly permeable aperture of the tray underneath to be situated in a vertical line. In this way, if more than one catalyst bed is used, the catalyst spaces delimited by the reactor wall, the bottom of a tray and the top of the supporting means underneath the said tray are interconnected via the (preferably central) opening of the supporting means and the (preferably central) opening of the tray. The opening of the supporting means is preferably connected to a pipe which debouches in the catalyst space underneath and passes through the opening of the tray. The diameter of the pipe may be selected depending upon such factors as the quantity of catalyst which it is desired to pass through per unit of time when loading and unloading the beds, the quantity of feed desired to be passed through the pipe in the operational mode of the apparatus without detracting from the requirement that it is desired to pass as much feed as possible through the tray, and, further, taking into account the desirability that the diameter should be large enough to allow a man to pass, if necessary, should the interior of the empty reactor require inspection. In general, a pipe diameter of 45–70 cm is suitable. In the case of, for example, a reactor diameter of 350 cm, a pipe diameter of 60cm will satisfy these requirements. The space velocity of the catalyst during loading and unloading can then be in excess of 50–60 m³/hr., the slip of the feed along the tray when the reactor is operational is then of the order of only 1–4% and this pipe diameter allows a man to pass.

During loading and unloading of the beds — which may be effected by means of an upward-flowing carrier liquid — the trays, which are impermeable to catalyst particles, prevent catalyst particles from contacting the underneath of the supporting means and remaining fixed there or being pushed between the wall of the reactor and the supporting means. In this combination of supporting means and of pipe connected to the opening thereof and passing through the opening of the tray, the catalyst stream is able to pass only through this pipe. Moreover, this tray is very useful in the operational mode because on exothermal reaction then takes place in the catalyst beds and the tray effects a redistribution of the liquid flowing out of the catalyst bed, as a result of which local overheating is avoided. When the reactor is operational, the tray therefore acts as a redistribution tray. The tray may be of the conventional type, for example a sieve tray made of perforated plate impermeable to catalyst and having a circular circumference which is attached thereby to the wall of the reactor. Preferably, the tray is also provided with devices for letting through gas or vapor, for example one or more cylinders or troughs arranged on the tray, at which areas the tray is gas-permeable but does not allow catalyst particles to pass. Preferably, the upper part of such a cylinder or trough is provided with an impermeable plate parallel to the plane of the distribution tray, in such a manner than the gas or vapor can flow through between the plate and the upper edge of the cylinder or trough.

The bottom of the upright reactor is preferably provided with a device for the unloading or catalyst, comprising a guide face permeable to liquid but impermeable to catalyst particles, which face is in the shape of a conical surface of a truncated cone attached by its circumference to the wall of the reactor and of which the central opening serves as outlet for catalyst particles when the catalyst is unloaded from the reactor. This central opening preferably connects to a pipe of which the wall is provided with orifices for liquid, preferably covered with a metal screen or gauze that does not allow catalyst particles to pass, which pipe connects to a closing device, for example a valve. The guide face may, if desired, be supported by filler elements between the conical surface and the wall of the reactor. A closable liquid line is connected to the space situated between the guide face and the wall of the reactor. Preferably, a line is also present for the supply of liquid to the orifices of the latter pipe.

Figure 2:
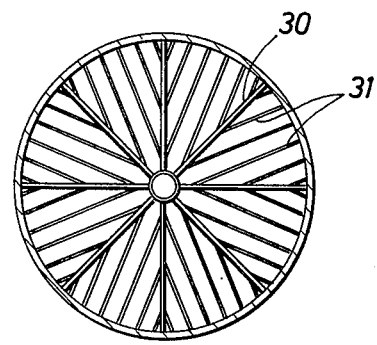
FIG. 2 is a cross-section of the apparatus shown in FIG. 1 taken on line 2—2.
Figure 3:
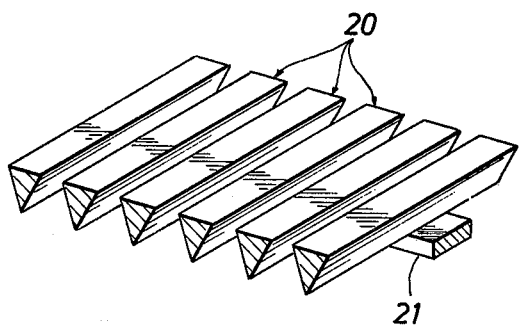
FIG. 3 is a perspective view of a detail of the conical surface shown in FIG. 2.

The apparatus according the the invention will now be elucidated with reference to FIGS. 1, 2 and 3.

Referring to the apparatus of FIG. 1, 1 is an inlet for feed which is used as an outlet for carrier liquid when the apparatus is being loaded with catalyst using a carrier liquid. 2 is a manhole through which catalyst can be added, 3 and 3a a conical surface which, with conduit 4 (4a), passed through the liquid-permeable tray 5 (5a) underneath, which is provided with cylindrical gas orifices 6 (6a). 7 is a liquid-permeable guide face for the unloading of catalyst, which face is in the shape of a conical surface of which the central opening connects with pipe 8 of which the wall is provided with orifices for liquid, which orifices are sealed with gauze (not shown) which does not allow catalyst particles to pass. 9 is a valve for the unloading of catalyst particles, 10 is an end plate and 11 is an outlet for feed which acts as inlet for carrier liquid when the apparatus is being loaded with catalyst. 12 is a supply line for liquid or gas. During operation, gas is supplied through 12, so that the space between the reactor wall and pipe 8 cannot fill up with hot liquid, which might lead to coke formation in the said space.

FIG. 2 is a top plan view, in enlarged scale, of the arrangement of rods 31 of which the conical surface 3 shown in FIG. 1 is built up. The rods are supported on supporting beams 30.

FIG. 3 shows in perspective, in enlarged scale, a number of rods 20 of triangular cross-section supported on an underlying supporting beam 21 (not shown in FIG. 2) which is positioned between two beams 30 shown in FIG. 2.

In order to load the apparatus with catalyst, a carrier liquid, for example a distillate hydrocarbon fraction such as kerosine, gas oil, a cycle oil from a catalytic cracking plant, or feed which is to be catalytically treated, is supplied to the apparatus through the liquid inlet 11 (FIG. 1) and after flowing through the apparatus removed through outlet 1.

Catalyst is introduced into the apparatus through the manhole 2. This may be effected in any desired manner, for example pneumatically, but preferably the catalyst is introduced as a slurry in a liquid, which is preferably said carrier liquid.

The flow velocity of the carrier liquid is so chosen that the settling velocity of the catalyst particles exceeds the upward velocity of the carrier liquid. Using gas oil as carrier liquid, this flow velocity is very suitably between 0.001 and 0.01 m/sec. The flow velocity is of course also dependent on the shape and the specific gravity of the catalyst particles, but for many commercially available desulphurization catalysts this flow velocity is generally very suitable with said carrier liquids. In quiescent gas oil, the settling speed of a customary desulphurization catalyst is of the order of 0.1 m/sec and in kerosine and cycle oil it is of the same order of magnitude.

The catalyst particles settling in the upward flow of carrier liquid form a bed on the upper conical surface, fall through the central openings of the conical surface and the tray in the catalyst spaces beneath and the bottom of the apparatus until ultimately all the catalyst spaces formed by a conical surface 3a and the superior tray 5, in addition to the pipes 4 (4a) and the space formed by the lowest tray, the guide plate 7 and the pipe 8 are entirely filled with catalyst particles. The flow of carrier liquid is then stopped and the addition of catalyst ceased. This method of loading the apparatus with catalyst may also be very suitably effected at a carrier liquid speed equal to 0, in other words in a still or quiescent carrier liquid. In that case, however, it is desirable to intermittantly cause the liquid to flow and to fluidize the particles, in order to obtain homogeneous loading of the catalyst beds.

After loading with catalyst, the apparatus may be put into operation, feed being supplied at 1 and leaving the apparatus at 11 and the carrier liquid being replaced by the feed.

When it becomes necessary, owing to contamination and deactivation of the catalyst, to replace the catalyst mass, it is possible to replace, as a preparatory measure, the liquid present in the reactor by gas oil or another carrier liquid in order to cool the hot catalyst until the desired lower temperature is reached. In most cases, by opening valve 9, as a result of which the catalyst mass is no longer supported from underneath, it is possible to cause the catalyst together with the carrier liquid to flow out of the apparatus as a slurry. Should the catalyst particles cohere to a certain extent and no longer form a loose mass, the catalyst can first be fluidized by introducing a carrier liquid via inlet 11 and via the liquid orifices of pipe 8. As a rule, a flow velocity of 0.01–0.03 m/sec is sufficient for the fluidization. After fluidization, valve 9 can be opened in order to unload the catalyst particles distributed in the carrier liquid. During this unloading the supply of carrier liquid may be stopped or the supply of carrier liquid may be continued in such a manner that less is unloaded per unit of time via the outlet 1 than is introduced via 11. In this way fluidization is continued while slurry is being unloaded via 9.

The apparatus according to the invention is by virtue of its design also suitable for a catalytic desulphurization of hydrocarbons with a moving bed, in which process the feed and the moving bed are passed co-currently downwards through the apparatus, as is, for example, described in the Netherlands patent application No. 7302262. In this case the catalyst and the reaction conditions as described in the said patent specification can be applied.

We claim as our invention:

1. An upright apparatus for the catalytic treatment of hydrocarbons, comprising a reactor containing at least one tray, and containing catalyst supporting means for at least one catalyst bed, said supporting means being permeable to liquid and gas and impermeable to catalyst particles, said supporting means being attached to the inner wall of the reactor and being at least partly in the shape of a conical surface of a truncated cone converging downwardly to an aperture permeable to catalyst particles, one of said trays being located beneath each supporting means, said trays being permeable to liquid and gas for effecting redistribution of liquid flowing out of the catalyst bed and impermeable to catalyst particles and having an aperture which is permeable to catalyst particles.

2. An apparatus as in claim 1, wherein the supporting means of each catalyst bed comprises a conical surface of one truncated cone, converging downwardly to an aperture which is permeable to catalyst particles, and is situated centrally in the reactor.

3. An apparatus as in claim 1 wherein the conical surface comprises supporting beams as linear elements of the conical surface, two such adjacent supporting beams encompassing a sector of the conical surface, a bisector of the angle between these adjacent supporting beams and in the said conical surface constituting a descriptive line of the conical surface, and wherein said conical surface further comprises groups of rods, all of the rods in each group running parallel to one another and parallel to the descriptive line for each said sector.

4. An apparatus as in claim 3 wherein the rods have smooth lateral faces and wherein a lateral face of each rod in each group is in a planar surface between two adjacent supporting beams.

5. An apparatus as in claim 1 wherein the acute angle formed by a descriptive line of the conical surface(s) and the axis of the reactor is from about 35° to about 45°.

6. An apparatus as in claim 1 wherein the catalyst particle-permeable opening of said supporting means and the catalyst-permeable opening of the tray underneath are situated in a vertical line.

7. An apparatus as in claim 6, wherein the opening of said supporting means is connected to a conduit which passes through the opening of the tray beneath.

8. An apparatus as in claim 1 comprising in addition a device for the unloading of catalyst, comprising a guide face in the shape of a conical surface of a truncated cone attached by its circumference to the wall of the reactor and of which the central opening connects to a valved conduit wherein the conduit wall is provided with liquid permeable catalyst impermeable orifices.

9. A method for loading the apparatus of claim 1 wherein the apparatus is loaded from the bottom upwards with a carrier liquid and that catalyst is supplied to the apparatus via an opening the top of the apparatus.

10. A method as in claim 9, wherein during the addition of the catalyst the carrier liquid has an upward flow velocity of 0.001–0.1 m/sec.

11. A method for the unloading of catalyst from a catalyst-loaded apparatus as in claim 1, wherein a carrier liquid is passed through the apparatus from the bottom upwards at an upward flow velocity of 0.01–0.3 m/sec.

12. A method as in claim 10, wherein less carrier liquid is unloaded from the top of the apparatus than is supplied to the apparatus.

* * * * *